Dec. 22, 1959

L. SHAPIRO 2,918,523

COLOR CORRECTION SYSTEM

Filed Oct. 30, 1956

3 Sheets-Sheet 1

INVENTOR.
Louis Shapiro
BY Morris L. Rabkin
ATTORNEY.

COLOR CORRECTION SYSTEM

Filed Oct. 30, 1956 3 Sheets-Sheet 2

INVENTOR.
Louis Shapiro
BY Morris L. Rabkin
ATTORNEY.

Dec. 22, 1959 L. SHAPIRO 2,918,523

COLOR CORRECTION SYSTEM

Filed Oct. 30, 1956 3 Sheets-Sheet 3

INVENTOR.
Louis Shapiro
BY Morris A. Rabkin
ATTORNEY.

United States Patent Office 2,918,523
Patented Dec. 22, 1959

2,918,523

COLOR CORRECTION SYSTEM

Louis Shapiro, Haddonfield, N.J., assignor to Radio Corporation of America, a corporation of Delaware Application October 30, 1956, Serial No. 619,225
11 Claims. (Cl. 178—5.2)

This invention relates to color-correction systems for color-reproduction processes, and more particularly to a system for obtaining a black plate for use in four-color reproductions.

In a three-color system of reproducing a colored original by means of printing plates, the blacks and grays of the original are reproduced by superimposing all three colored inks. While it is theoretically possible to produce any color, within certain limits, by combining, in proper proportions, inks of the three subtractive primary colors, cyan, magneta, and yellow the use of black in addition to the three primaries has a number of advantages. Due to deficiencies in the inks, a very dark black cannot generally be produced by an overlay of the three ink primaries. In four-color printing, the use of black ink in addition to the primaries provides a greater brightness range. Other advantages of the four-color system are the saving of relatively expensive colored inks and sharper outlines and details in the printed reproduction. Accordingly, four-colored reproductions are generally preferred.

In a four-color system of color-correction, the colored original is scanned with a beam of light to produce three sets of electrical signals representative of the additive color primaries, red, green, and blue. From these signals, four sets of corrected electrical signals are computed representative of the subtractive primaries and black. The corrected signals are used to control the intensity of a light source to expose four color-corrected negatives or "printers," which are used to make the printing plates.

In the past, it was proposed to print black ink where all three of the colored inks would be superimposed in the three-colored system. To compensate for the addition of black ink, the under-color that produced black was removed. A dot of black ink replaced the area of the smallest color dot, and the sizes of the other color dots were correspondingly reduced by the size of the black dot. One such proposed system is described in the patent to Hall, U.S. No. 2,231,668. This type of system for preparing the color-corrected negatives has not given optimum results. As explained in the patent to Hardy et al., U.S. No. 2,431,561, the accurate computation of the black and subtractive primary dot sizes requires consideration of much more complex relationships among the dot sizes than the simplified theory implies. This Hardy patent discloses a system for computing the ink dot sizes, that takes into account these complex relationships.

In the preparation of a black printer, it is not only desirable that theoretical requirements are met, but also that the practical requirements and preferences of the photoengraving and graphic arts are met. It has been found, for example, that it is preferred that black not be printed, or printed only in small amounts in certain instances, even though all three of the subtractive primaries are present. Furthermore, these preferences are not uniform. It is apparent, therefore, that a system for preparing a black printer that can be readily adapted to carry out the varied requirements and preferences of the graphic arts is needed.

In a patent application "Color Correction Systems" of H. J. Woll, Serial No. 371,371, filed July 30, 1953, now Patent No. 2,848,528, issued August 19, 1958, and assigned to the same assignee as that of this invention, another black printer system is described. In a system described in this copending application, a brightness signal is derived that is related to the brightness of the image area to be reproduced. Another signal is derived that is related to the color saturation condition of the image area to be reproduced. A black signal is generated in accordance with both the brightness and the saturation signals.

In a color correction computer of the type described in the aforementioned Hardy patent, the computer tends to operate as though an overlay of the three colored inks (for example, certain proportions of cyan, magenta, and yellow) is the same as black ink. However, for many purposes the three color overlay is not the same as black ink; and often the eye may note the difference in a printed reproduction. As a result, for certain printed copy, it is desirable that sharp transitions from black ink to a three color overlay representing black be avoided in adjacent areas of a printed reproduction. It has been found that the etching action of the photoengraving process tends to be non-linear at sharp edges of the photoengraving plate. This etching action tends to accentuate any sharp transitions of the image represented by these sharp edges in the three color and black plates. As a result of this etching action, any sharp transitions between black ink and a three color overlay for black tend to become more pronounced. It has also been found that the changes in black ink in image areas calling for gradual transitions should be not greater than a certain number of times the rate of change of that colored ink that is changing most rapidly. If this relationship is not maintained, excessive black ink tends to be printed at certain areas and spurious detail in these areas results. In addition to the foregoing objections to sharp edges in a black plate, certain portions of the printing industry have marked preferences for a black plate that has gradual or controlled transistions and avoids sharp edges (except, of course, when an image to be reproduced contains such sharp transistions).

In a patent application of Louis Shapiro, Serial No. 599,255, filed July 20, 1956, assigned to the same assignee as that of this invention, another black printer system is described. In a system described in this copending patent application, brightness and saturation signals are derived, and are continuously combined over an extended range of both signals; the black printer signal is derived from the combined signal.

Such a black printer system has been found to give favorable results. The operation of the system is such that in a region where one or more of the inks is substantially 0% in amount, the action of the derived saturation signal is such as to cause the amount of black ink to go to substantially 0% also. For certain purposes, and with certain types of subject to be reproduced, this mode of operation, it was found, should be modified in certain types of colored regions which colorimetrically may be called "pastel." A "pastel" region may be defined as one in which each of the computed colored inks is less than a certain small percentage, such as, for example, 10%.

Generally, the colored printed reproduction of a pastel region by means of only the colored inks tends to be reduced in distinctness or definition of certain image contours and details. Since there is little or no black ink to be reproduced, by action of the saturation signal, in these pastel areas, and black printing plate carries little or no picture information located in such pastel areas. Yet it is often desirable to use the black plate separation to insert cerain types of material, such as referencing arrows, printed text, etc. Such insertion of material is especially desirable in copy such as catalogues. Where the black plate separations lack picture information in the pastel areas, there may be considerable difficulties in positioning such inserted material.

Accordingly, it is among the objects of this invention to provide:

A new and improved system for producing a black printer;

A new and improved system for producing four color corrected records corresponding to three primary colors and black; and A new and improved color correction system that may be readily adapted to meet varied preferences and requirements in the amount of black to be printed.

A new and improved black printer that includes substantial black values in areas where a pastel region is to be reproduced.

In accordance with this invention, a brightness signal is produced in accordance with the brightness of the area to be reproduced. A saturation signal is produced in accordance with the extent to which all three of the component colors to be reproduced are present. Generally, these brightness and saturation signals are combined over an extended range of both signals; the black printer signal is generally derived from the combined signal. However, in "pastel" regions, where all of the inks are less than a certain relatively small percentage, the effect of the saturation signal is inhibited, and the black-printer signal is derived essentially from the brightness signal. The resulting black printer includes substantial black values in pastel areas.

The foregoing and other objects, the advantages and novel features of this invention, as well as the invention itself both as to its organization and mode of operation, may be best understood from the following description, when read in connection with the accompanying drawing, in which like reference numerals refer to like parts, and in which.

Figure 1:
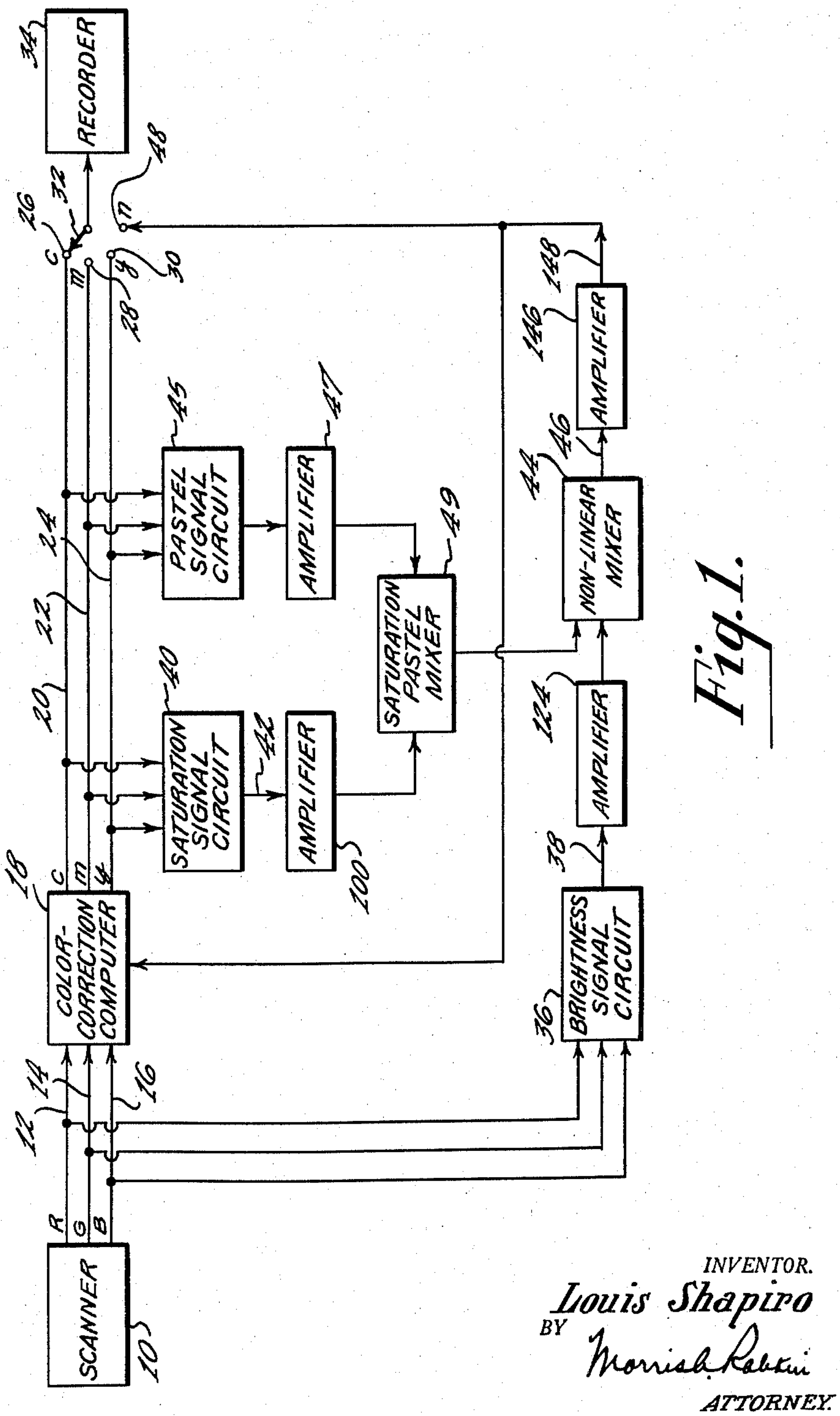
Figure 1 is a schematic block diagram of a color-correction system embodying this invention.

In Figure 1, a color-correction system embodying this invention is shown. A subject (not shown) having color characteristics is scanned by means of a scanner system 10 to provide electrical signals on three channels 12, 14, and 16 corresponding to color component characteristics of this subject. The signals on the channels 12, 14, and 16 may correspond, for example, to certain additive primary colors, such as, those commonly known as red (R), green (G), and blue (B), respectively. The spectral characteristics of these primary colors are determined by the choice of color filters (not shown) used with the scanner system 10. An appropriate form of a flying spot scanner system that may be used for this purpose is described in U.S. Patent No. 2,740,828.

The R, G, and B signals in the channels 12, 14, and 16 are applied to a color-correction computer which may be of the type described in the aforementioned Hardy patent, U.S. No. 2,431,561. The outputs of this computer 18 are electrical signals in the channels 20, 22, and 24. These electrical signals correspond to values of the colored inks that may be used to provide a printed reproduction of the original colored subject. Commonly used colored inks for such printed reproductions are cyan ($c$), magenta ($m$), and yellow ($y$).

The computer output channels 20, 22, and 24 are connected to selector switch terminals 26, 28, and 30, respectively. The movable contact 32 of the selector switch connects one of these terminals 26, 28, 30 to a recorder 34, which may be operated synchronously with the scanner 10 to produce color corrected photographic separations of the original subject. An appropriate form of recorder is described in patent U.S. No. 2,740,828, noted above. From these corrected photographic separations one may make the photoengravings that are used to print the reproduction.

The R, G, B signals in the channels 12, 14, and 16 are also applied to a brightness signal circuit 36. This circuit 36 produces in its output channel 38 a signal that is related to the brightness or luminance of the original subject being scanned; the brightness or luminance of an image is greatest in light areas, and least in dark areas. This brightness signal is derived from a combination of all three of the R, G, B signals, an appropriate combination is described hereinafter. This brightness signal is amplified and set at an appropriate signal level in the amplifier 124, and applied to one input of a non-linear mixer 44.

The ink signals $c$, $m$, and $y$ in the computer output channels 20, 22, and 24 are also applied to a saturation signal circuit 40. This saturation signal circuit 40 derives from the ink signals $c$, $m$, and $y$, a signal that is related to the color saturation or purity of the image area to be reproduced; a color has a low level of saturation or purity when it is made up of substantial amounts of all three inks, and a high level of saturation when at least one of the inks is absent or substantially absent. This saturation signal is supplied by way of the channel 42 to an amplifier 100 where the saturation signal is amplified and set at an appropriate signal.

The ink signals $c$, $m$, and $y$ in the computer output channels 20, 22, and 24 are also applied to a pastel signal circuit 45. A pastel region may be defined as one in which each of the computer colored inks is equal to or less than a certain relatively small percentage, that is, a region of relatively pale color. For the purpose of illustrating a particular embodiment of the invention, this small "pastel-region" percentage is assumed to be the same for all of the inks and equal to 10%; other percentage values may be appropriate for different preferences or requirements. The pastel signal circuit derives a signal that is related to the condition of the region defined by the three inks $c$, $m$, and $y$ being a pastel region or not. This pastel signal is amplified and set at an appropriate signal level in the amplifier 47.

The outputs of the saturation amplifier 100 and the pastel amplifier 47 are applied to a saturation-pastel mixer 49. The mixer 49 operates in a non-pastel region to supply substantially the saturation signal to the non-linear mixer 44. The mixer circuit 44 combines the saturation signal and the brightness signal from the amplifier 146 in accordance with certain relationships of the brightness and saturation signals to produce a black signal for an output signal. This black ($n$) signal in the channel 46 is amplified and set at an appropriate signal level in the amplifier 146. The output of the amplifier 146 is fed back as an input to the color correction computer 18, and this $n$ signal is also fed as an output to the selector switch terminal 48.

In a pastel region the pastel signal from the amplifier 47 effectively inhibits the action of the saturation signal; the resulting signal from the mixer 49 that is routed to the non-linear mixer 44 is such that the black signal is generated substantially in accordance with the brightness signal from the amplifier 124. The saturation-pastel mixer 49 may be generally arranged to provide a transition between the combined pastel-saturation signal from the mixer 49 as the colorimetric region changes from a non-pastel region to a pastel region.

Figure 2:
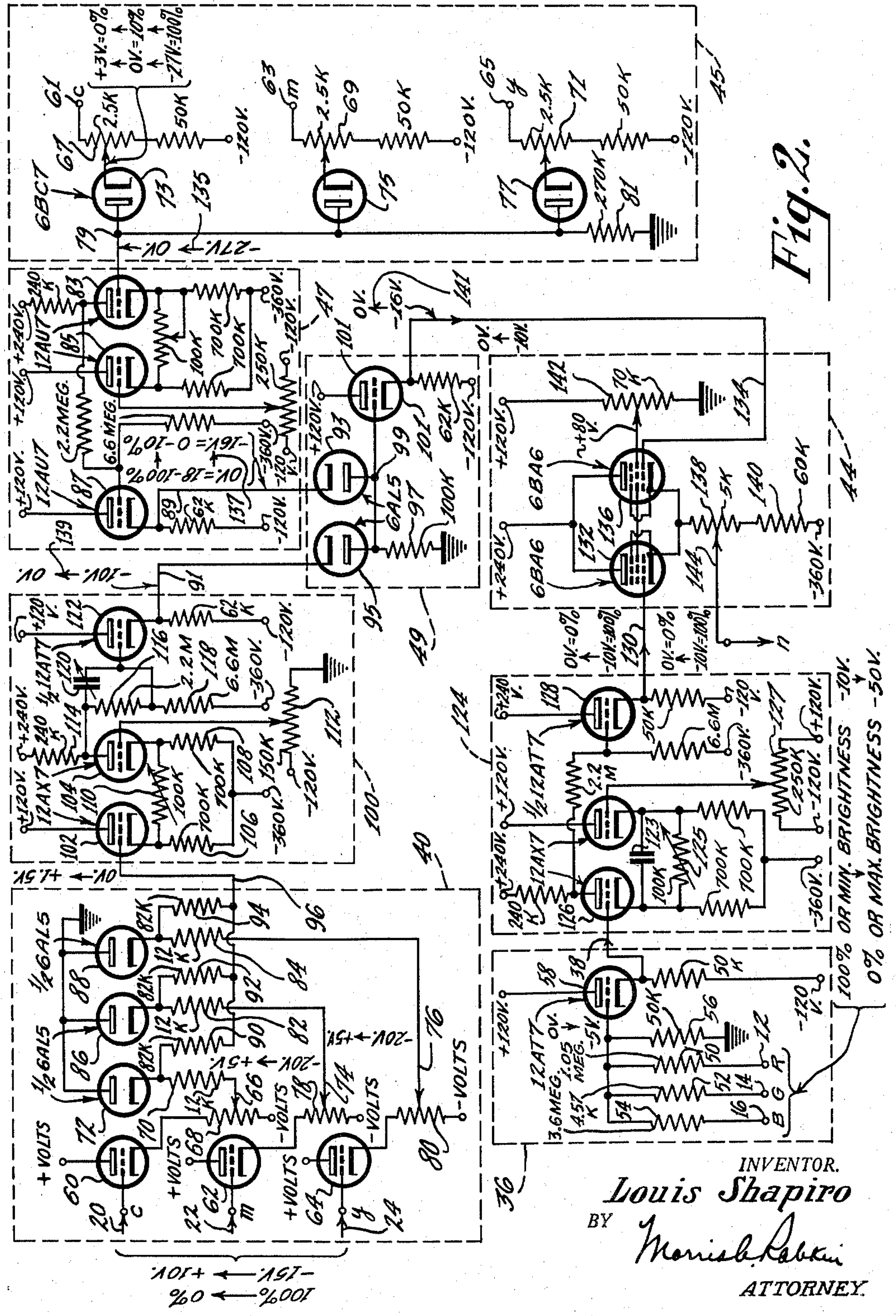
Figure 2 is a schematic circuit diagram of circuits that may be used for portions of the system shown in Figure 1.

In Figure 2, a schematic circuit diagram is shown of appropriate forms of this brightness signal circuit 36, the saturation signal circuit 40, the pastel signal circuit, and their respective amplifier circuits 124, 100, and 47. The brightness signal circuit 36 may include three summing resistors 50, 52, and 54 that have terminals respectively connected to terminals of the R, G, B channels 12, 14, and 16. The other terminals of these summing resistors 50, 52, and 54 are connected together to a terminal of a load resistor 56, the other terminal of which is connected to a reference potential terminal shown as ground. The common terminal of the summing resistors 50, 52, and 54 is also connected to the grid of a cathode follower circuit 58. The voltage that is applied to the grid of the cathode follower 58 is proportional to a weighted sum of the R, G, B signals. The values of these resistors 50, 52, and 54 are chosen to provide a brightness signal that is weighted in accordance with certain desirable proportions, such as, for example, proportions that are generally considered to correspond to the characteristics of the green receptor of the human eye. This weighted brightness signal produced by the parameters shown in Figure 2 is made up of approximately 28% of the red signal, 64% of the gree signal, and 8% of the blue signal; other percentages may be used in accordance with the spectral characteristics of the primary colors, red, green, and blue, that are used.

In the saturation signal circuit 40, three cathode follower circuits 60, 62, and 64 receive voltages at their respective grids that are *c*, *m*, and *y* signals from the ink channels 20, 22, and 24. An adjustable tap 66 on the cathode resistor 68 of the *c*-signal cathode follower 60 is connected through a resistor 70 to the cathode of a limiting diode 72; the anode of this diode 72 is connected to ground. In a similar manner, adjustable taps 74 and 76 of the cathode resistors 78 and 80 are connected by way of resistors 82 and 84 to the cathodes of the diodes 86 and 88, respectively. The anodes of these diodes 86 and 88 are also connected to ground. The cathodes of all three diodes 72, 86, and 88 are connected through separate summing resistors 90, 92, and 94 to a common connection 96. The diodes 72, 86, 88 limit the ink signals to voltage excursions above ground, and the resistor network 90, 92, 94 produces a voltage at the connection 96 that is approximately proportional to the average of these positive voltages.

The output 96 of the saturation signal circuit 40 is connected to a saturation amplifier circuit 100. This amplifier 100 includes two triodes 102 and 104 having a common cathode impedance network made up of two resistors 106 and 108 respectively connected between the cathodes of the tubes 102 and 104 and a negative voltage supply. This network also includes an adjustable resistor 110 connected between the cathodes of the tubes, whereby the gain of the amplifier 100 is adjusted. The grid of the tube 102 receives the varying output of the saturation circuit 40. The grid of the tube 104 receives a constant voltage supplied from a potentiometer 112, which serves to supply an appropriate direct voltage level to the varying signal. The output of the amplifier consisting of triodes 102 and 104 is taken by means of a voltage divider that includes the anode load resistor 114 of the tube 104 in series with two other resistors 116 and 118. A capacitor 120 is connected across the middle resistor 116 to afford a suitable frequency response. The junction of the resistors 116 and 118 is connected to the grid of a cathode follower 122, from the cathode of which the amplifier output is taken on the connection 91 and supplied to the mixer 49.

The brightness signal produced by the circuit 36 is amplified in an amplifier circuit 124 of the same general type as the amplifier 100. To assure proper signal phase relationships the amplified output is derived from the anode of the tube 126, whose grid receives the varying brightness signal from the circuit 36. Otherwise, the circuit 124 is substantially the same as the circuit 100 described above; the gain adjustment resistor 125 is shunted by a capacitor 123, and the capacitor 120 of the amplifier 100 is not used in the circuit 124. The capacitor 123 is used to ensure proper frequency response; other resistors, such as the resistors 50, 52, and 54 may be shunted in a similar manner for the same purpose. The output of the amplifier circuit 124 is taken from the cathode of a cathode follower 128 and supplied by way of the connection 130 to the mixer 44.

In the pastel signal circuit 45 (Figure 2) the *c*, *m*, and *y* voltages are received at terminals 61, 63, and 65, respectively. These terminals 61, 63, and 65 may be connected directly to the cathodes of the cathode follower tubes 60, 62, and 64 in the saturation signal circuit 40. Adjustable resistor combinations 67, 69, and 71 are respectively connected between the terminals 61, 63, and 65 and a negative voltage source. These resistor combinations 67, 69, and 71 are effectively connected in parallel with the adjustable cathode resistors 68, 78, and 80, respectively, in the saturation circuit 40. The adjustable taps on the resistors 67, 69, and 71 are each connected to the cathode of a different diode 73, 75, and 77. The anodes of these diodes 73, 75, and 77 are connected together at the junction 79 and to a terminal of a load resistor 81, the other terminal of which is connected to ground.

The junction 79 is connected to the grid of a tube 83, which together with a second tube 85 is connected in a direct-coupled amplifier circuit in the pastel-signal amplifier 47. This amplifier 47 is generally similar in construction and operation to the brightness signal amplifier 124 described above. The output of the pastel amplifier 47 is taken at the cathode of a cathode follower 87, which cathode connection is referenced by the numeral 89.

The output 89 of the pastel amplifier 47 and the corresponding output 91 of the saturation amplifier 100 are individually connected to the cathodes of two diodes 93 and 95, respectively. The anodes of these diodes 93, 95 are connected together and to a terminal of the load resistor 97, the other terminal of which is connected to ground. The anode junction 99 of the diodes 93 and 95 is connected to a grid of a cathode follower 101, the cathode of which is the output connection of the mixer 49.

This cathode terminal of the cathode follower 101 in the mixer 49 is connected to one input 134 of the nonlinear mixer 44. The other input 130 of this mixer 44 is connected to the cathode terminal of the cathode follower 128 of the brightness amplifier 124. The mixer circuit 44 may be of different types; one appropriate type includes two remote cutoff pentodes 132 and 136, the first grids of which are connected to the inputs 130 and 134, respectively. The anodes of these tubes 132, 136 are connected to the positive terminal of a source of operating potential. The cathodes of these tubes 132, 136 are connected together and by way of an adjustable resistor 138 and a fixed resistor 140 to the negative terminal of a source of operating potential. The third grids of these tubes are connected to their respective cathodes. The second grids, or screens, of these tubes 132, 136 may be supplied with a fixed potential from a potentiometer 142. The output of the mixer 44 is at the adjustable tap 144 of the cathode resistor 138.

The signal at the tap 144 is amplified in the black-signal amplifier 146, which is generally of the same type as the saturation amplifier circuit 100 described above. This amplifier 146 (shown and described in detail in the aforementioned copending patent application, Serial No. 599,255) also supplies appropriate direct voltage levels to the black signal, such that the signal developed at the output 148 of this amplifier 146 is appropriate for application to the aforementioned color-correction computer 18.

In the following discussion, percentiles are used to define the amount of ink applied to a unit area. For example, in a half-tone printing process, 100% ink corresponds to full ink coverage of the half-tone unit area; lesser percentiles are proportionate coverage of that unit area; and 0% represents the absence of ink in the unit area. For convenience in relating the R, G, B signals to the ink signals, percentiles are also used for these R, G, B signals and for the brightness function derived therefrom. The R, G, B percentiles represent the proportionate amount of the possible range of these R, G, B inputs to the computer 18. For convenience in relating the ink signals and the R, G, B signals to each other, increasing percentiles in each case represent decreasing brightness. Thus, 0% in each of the R, G, B and brightness signals represents a maximum brightness value of the signal, and 100% represents a minimum brightness.

A particular set of circuit parameters is shown in the circuit of Figure 2 in order to illustrate an operative embodiment of this circuit and the system of this invention, and also to simplify the presentation and explanation.

For the parameters shown, the R, G, and B signals in the channels 12, 14 and 16 each may range from —10 volts to —50 volts, corresponding to a brightness range in the original subject being scanned that goes respectively from minimum brightness to maximum brightness. These R, G, B signals are summed by the network of the resistors 50, 52, 54 to produce a brightness function signal at the output connection 38. The resulting output of the summing network at the connection 38 varies approximately from 0 volts to —5 volts (and the output of the amplifier 124 at the connection 130 varies from —10 volts to 0 volts) corresponding to a brightness signal range from minimum to maximum brightness. The arrows that indicate these and other signal ranges in Figure 2 point "to" the signal values of smallest percentile (corresponding generally to maximum brightness or maximum saturation, as the case may be) and point "from" the signal values of largest percentile (minimum brightness or minimum saturation).

The saturation circuit 40 operates as follows: The diodes 72, 86, and 88 of the saturation signal circuit 40 are respectively associated with the cyan, magenta, and yellow signals. These diodes 72, 86, and 88 limit negative excursions of the ink signals at the diode cathodes to substantially ground potential. Voltages above ground are not limited and contribute to the saturation signal developed at the connection 96. These voltages at the diode cathodes that are not limited (vary above ground) are assumed for simplicity of illustration to be the same and correspond to ink values that vary from approximately 15% to 0% (different saturation-control ink values that may be employed are described in the aforementioned copending patent application, Serial No. 599,255).

The limiting voltages at the diode cathodes of the saturation circuit 40 are averaged by the network that includes the resistors 90, 92, and 94 to provide an average voltage at the common connection 96. The voltage at the common connection 96, varying approximately from ground potential to +1.5 volts, corresponds to a total of the cyan, magenta, and yellow ink,varying from approximately 45% (15+15+15) to 0%. The condition of 45% is reached when each of the inks is at or greater than its 15% value at which the saturation effect is assumed to start. A voltage level of 0.5 volt at the connection 96 signifies that one or more ink values has passed into the saturation control range and that some condition equivalent to a near maximum saturation effect exists to which no black ink is ordinarily to be printed. The corresponding voltage range at the saturation amplifier output 91 is —10 volts to 0 volts, corresponding respectively to the extremes of minimum effective saturation to near maximum saturation. This saturation signal is applied via the connection 91 to the mixer 49.

The pastel signal circuit 45 operates as follows: The resistors 67, 69, and 71 are adjusted such that the voltages at the adjustable tap are each at approximately ground potential when the associated input ink value is at 10%. If any of the ink values are greater than 10%, the tap of the corresponding one of the resistors 67, 69, 71 falls below ground potential and the associated one of the diodes 73, 75, 77 conducts. Thus, the voltage at the anode junction 79 falls below ground potential. The circuit of these diodes 73, 75, 77 operates to produce at the anode junction 79 approximately the most negative of the diode cathode voltages; that is, the circuit 45 operates to "select" the minimum one of the input voltages below that ground. This junction 79 remains at ground potential, however, if all of the cathode voltages are at ground potential or more positive than ground. Thus, the range of voltage at the anode junction 79 is from —27 volts to 0 volts, corresponding to a minimum ink value range of 100% to 10%, with the upper limit of 0 volts at the junction 79 corresponding to a range of ink inputs of 10% to 0%.

Corresponding to this voltage range at the anode junctions 79, is a voltage range at the output 89 of the pastel amplifier 47 that goes from 0 volts to —16 volts. The 0 volt limit at the connection 89 corresponds to a minimum ink value ranging from 18 to 100%. The —16 volt limit corresponds to a maximum ink value of 0 to 10%; that is, the —16 volt limit at the connection 89 represents a condition of all of the inks being 10% or less.

The pastel-saturation mixer 49 is essentially a minimum-selector circuit, in which the voltage at the diode anode junction 99 is the minimum one of the voltages at the input connections 89 and 91. Thus, the voltage at the output 134 of the mixer 49 ranges from —16 volts to 0 volts.

The operation of the non-linear mixer 44 using the remote cutoff pentodes 132, 136 is described in detail in the aforementioned copending application, Serial No. 599,255. This circuit 44 operates to produce at the output connection 144 a voltage somewhat proportional to the extreme-value one (that is, the more positive one) of the voltages at the inputs 130, 134. That is, the voltage at the terminal 144 is dominated by the extreme-valued one of the voltages at the inputs 130, 134. However, both of the voltages of the input 130, 134 always make some contribution to the generation of the voltage at the output 144; when the input voltages are close in amplitude, the output voltage is approximately the average of the inputs.

The arrows 135 and 137 marking the signal ranges at the connections 79 and 89 point from a minimum-brightness ink (*c*, *m*, or *y*) value to a maximum brightness value consistent with the aforementioned convention. The arrow 137 points to the lower limit of the voltage range which is the reverse of the range-marking arrow 139 for the saturation-circuit output 91. The reason for this reversal is that a pastel signal at the connection 89, say —10 volts, represents a condition of a relatively small amount of colored ink; on the other hand, the same voltage for the saturation signal at the connection 91 represents a relatively larger amount of colored ink. The range arrow 141 at the output 134 of the pastel-saturation mixer 49 points to the voltage limit corresponding to the maximum brightness value of the black ink signal which that voltage tends to generate in the mixer 44. However, the voltage at the pastel-saturation mixer output 134 relates back to one or the other of two different colored ink conditions depending on whether the pastel signal or the saturation signal is selected by the circuit 49.

Figure 3:
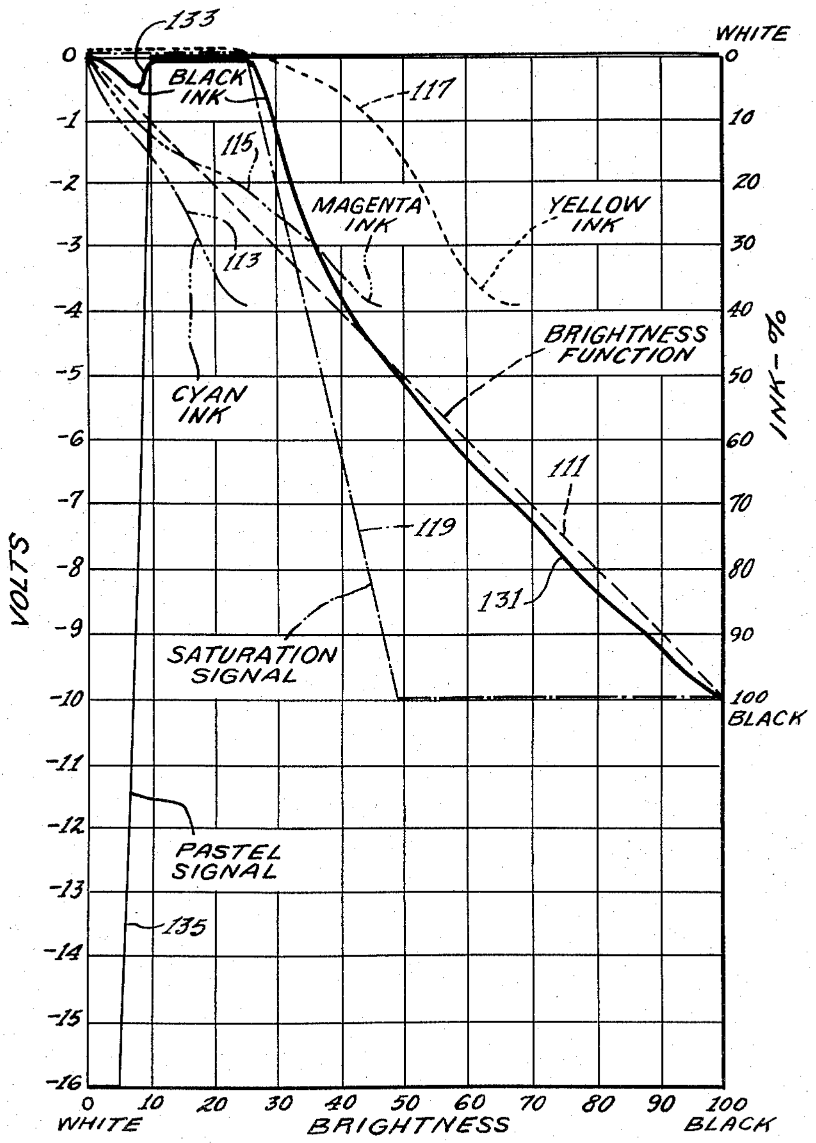
Figure 3 is an idealized graph used to explain the operation of the system of Figures 1 and 2.

Reference is made to the graph of Figure 3 for the purpose of explaining colorimetrically the mode of operation of the circuits shown in Figure 2. The following colorimetric explanations are the best presently available that appear suitable to explain the observed phenomena. In the graph of Figure 3, the brightness, or luminance, function is plotted along the abscissa coordinate and ink values (together with corresponding voltages at different portions of the circuits) are plotted as the ordinates. The ink values are plotted as percentiles.

In Figure 3, the line 111 (identified as the "brightness" function) represents values of voltage generated at the connection 130 by the brightness signal circuit 36 and the amplifier 124. This line 111 may also be considered as representing values of black that may be generated by the brightness signal without any contribution from the saturation or pastel signals. This graph 111 is the aforementioned brightness, or luminance, function, which may be, for example, $$L=28\%R+64\%G+8\%B$$

for values of R, G, and B ranging from 0% to 100% from maximum to minimum brightness.

A colorimetric condition that may be used to set up the circuits is one of all the inks being present and at maximum amounts; that is, a condition in which the computer 18 is set up to produce a combination of inks corresponding to the black limit of the printed reproduction. In one representative segment of the printing industry, an appropriate combination of inks representing this black limit of 100% brightness (i.e., minimum brightness) is 60% of *c*, 50% of *m*, 40% of *y*, and 100% of *n*. This set of values corresponds to the point having coordinates 100%, 100% on the brightness graph 111 in Figure 3; the condition that exists when $R=G=B=100\%$. (In the computer of the aforementioned U.S. Patent No. 2,431,561, the ink values of 0% and 100% are limits that are not generally reached in practice due to a pulse-duration mode of ink value representation. Actual limits of ink values are approximately 1% and 99%. However, for simplicity of presentation, the limits of 0% and 100% are described as though they actually occur, and as they might occur in a different type of computer.)

This graph 111 of the brightness function establishes one condition for the generation of black. A second condition for the generation of black is that when any of the computer ink values *c*, *m*, or *y* is reduced below some percentage indicative of a relatively high saturation condition, such as, for example, 15%, *n* should be reduced in percentage value by an appropriate amount. This condition may be explained in terms of saturation or purity: When one of the colored inks *c*, *m*, or *y* goes to a region near 0%, the printed color ordinarily is one of maximum or near-maximum saturation, or purity, and black should not be present. These principles and the mode of operation of the saturation circuit 40, the brightness circuit 36, and the non-linear mixing circuit 44 to produce a black signal are explained in the aforementioned copending application, Serial No. 599,255.

Considering further the idealized graph of Figure 3, it is seen that there are three ink curves 113, 115, and 117, which are labeled cyan, magenta, and yellow. These curves 113, 115, 117 (the only portions of which that are shown are those for ink values less than 35%) are used to illustrate changes that take place at the saturation amplifier output 91, the pastel amplifier output 89, and the pastel-saturation mixer output 134. These ink curves 113, 115, and 117 are not intended to illustrate combinations of ink values that would actually occur; the actual ink curves may be far more complex than these shown and may not be suitable for presentation on a single graph such as that shown in Figure 3. Thus, these graphs 113, 115, and 117 may be considered in their association with the luminance function 111 as a possible approximate variation of ink values over a certain portion of the brightness range as the brightness function goes towards 0%. (The voltage scale of Figure 3 is not applicable to the colored ink curves 113, 115, 117.)

In the range of brightness function values from 100% (black) to above 50%, all of the ink values are assumed to be greater than 15%, the average saturation control value. Thus, in this range of brightness above 50%, for the assumed situation illustrated in Figure 3, the voltage at the saturation circuit output 96 is at 0 volts, and the voltage at the saturation amplifier output 91 is at −10 vols, representing a minimum-saturation condition. This is shown in Figure 3 by the horizontal portion of the saturation signal curve 119 from 100% brightness to above 50% brightness. The output of the pastel signal amplifier 47 remains at 0 volts as long as one of the inks remains above 18%; it is only when all three inks are below 18% that the voltage at this amplifier output 89 falls below ground. For the conditions assumed in Figure 3, the pastel signal falls below 0 volts starting at a brightness abscissa of approximately 10% when the cyan ink, the last of the three colored inks, falls below 18%.

Thus, as the brightness function changes from 100% to about 50%, the saturation amplifier output 91 is at −10 volts, and the pastel amplifier output 89 is at 0 volts. Accordingly, the saturation signal, −10 volts, is supplied to the output 134 of the pastel-saturation mixer 49. Over this brightness range of 100% to 50%, the black-signal output of the non-linear mixer 44, shown by the graph 131, is very close in value to the brightness function 111, because the saturation signal at the mixer input 134 is so low that it contributes only a relatively small amount to the black signal.

At a brightness function value of approximately 50%, the yellow ink curve is shown passing below an ink value of 15%; thus at this point the voltage at the cathode of the yellow saturation diode 88 starts to rise above ground potential, which results in the saturation signal at the amplifier output 91 rising above −10 volts. The voltage at the output of the mixer 49 continues to follow the saturation signal at the connection 91 for a considerable range of the brightness function going from 50% down to about 25%. As the yellow ink value becomes smaller and smaller towards 0%, the saturation signal at the connection 91 approaches 0 volts, as does the input 134 of the mixer 44. Thus, over this range of brightness values, the saturation signal becomes more important in the generation of the black signal. The saturation voltage at the mixer input 134 becomes less negative than the brightness voltage at the mixer input 130 for brightness values below 30%.

The saturation signal approaches ground potential as the yellow ink curve 117 approaches 0% and as a near-maximum saturation condition is reached. Correspondingly, as the saturation voltage approaches ground potential, the generation of black ink, shown by the curve 131, tends to be dominated by the saturation signal, and black ink becomes 0% (consistently with the existence of a near-maximum saturation condition) when the saturation signal reaches ground potential. This effect of the saturation signal on the generation of black is explained in the aforementioned copending patent application Serial No. 599,255.

As shown in Figure 3, the saturation signal is assumed to reach 0 volts (0%) as the yellow ink value reaches 0%, which condition is shown as occurring at a brightness function value of about 25%. The voltage at the output 144 of the mixer 44 remains at 0 volts (0% black ink) as the brightness function changes from about 25% to about 10%. At a brightness function value of about 10%, the cyan ink, illustrated in Figure 3 as the ink of greatest numerical value, falls below 18%. Under these circumstances, the pastel signal at the amplifier output 89 becomes negative; and the voltage at the anode junction 99 of the mixer 49 follows this pastel signal voltage below ground potential as does the output voltage of the mixer 49 at the connection 134. Accordingly, the voltage at the output 144 of the mixer 44 is reduced somewhat below ground potential to generate a black ink value of greater than 0%, which situation is shown at the portion of the black ink curve referenced by the numeral 133.

In a region where any of the inks are between 10% and 18%, there is a transitory condition in which the pastel signal lies between 0 volts and −10 volts. Under these circumstances, the output of the mixer 44 is a combination of a substantial amount of the brightness signal at the connection 130, and the pastel signal at the connection 134, with the mixer 44 operating in the usual fashion. A different situation exists when all of the inks are 10% or less, corresponding to the aforementioned "pastel" condition. This situation is shown in Figure 3 for brightness function values below about 5% with all of the colored inks below 10%. In this situation, the pastel signal is reduced to −16 volts and makes a negligible contribution to the output of the mixer circuit 44. Thus, during the range of the brightness signal from about 5% to 0% (for the conditions assumed for Figure 3), black ink is generated in a substantial amount, which is effectively determined by the brightness function 111. At a brightness value of 0%, there is a limiting "white" condition of the colored inks and black ink all going to 0%.

The generation of black ink as represented by the graph 131 in Figure 3 over a full brightness range from 100% to 0% may be summarized as follows: For the illustrative, simplified colorimetric situation represented in Figure 3, and over a brightness range from 100% to 50%, the saturation circuit 40 is effectively inoperative, as is the pastel circuit 45. That is, the saturation signal remains at −10 volts and the pastel signal at 0 volts throughout this brightness range. As a result, the black ink curve 131 follows the brightness function 111 substantially for brightness values from 100% to 50%. There is but a small contribution to the black ink curve 131 from the saturation voltage of −10 volts due to the particular type of non-linear mixer 44 that is used.

At a brightness value of about 50%, one of the inks (yellow) falls below 15%, the saturation control level. From that saturation control level to the point at which this yellow ink goes to 0% (at a brightness value of about 25%) the saturation circuit 40 is operative to generate a saturation voltage more positive than −10 volts through its range to 0 volts, the latter corresponding to a near-maximum saturation condition. As the saturation signal increased from −10 volts, this saturation signal makes a greater contribution to the value of black ink that is generated. When the near-maximum saturation condition is reached (yellow ink at 0%) the value of the black ink curve 131 is reduced to a value of 0%.

The black ink curve 131 remains at 0% throughout the condition of a near-maximum saturation, except where a "pastel" region or a transitory pastel condition exists. The transitory condition may be defined as a condition at which the ink of numerically largest percentage lies between the "pastel" region value (illustrated at 10%) and some somewhat larger value (illustrated as 18%) chosen to ensure a smooth transition into the pastel region. This transitory condition is shown in Figure 3 occurring between the brightness values of 10% and 5%; between these brightness values a pastel signal below 0 volts is generated, which is reduced to the limit of −16 volts when the "pastel" region of all the inks being 10% or less is reached. In the transitory region, the pastel signal is combined with the brightness signal to produce a smooth transition into the pastel region. In the pastel region, the black ink curve 131 is generated in accordance with the brightness function 111, because the pastel voltage is essentially too low to make a significant contribution to the black signal in the mixer circuit 44. Thus, there is a "reversal" in the curvature of the black ink curve 131 in the region references by the numeral 133, which reversal is due to the operation of the pastel circuit 45 and the mixer 47.

The generation of black ink in regions of near-minimum saturation and low brightness is essentially in accordance with the brightness function. In regions of near-maximum saturation, and in transistory saturation regions, the saturation signal contributes to control the generation of black and tends to reduce the amount of black that is generated towards 0% as the near-maximum saturation limit is reached. However, in a pastel region and in an associated transitory pastel region, there is a change from a "saturation" control of the generation of black to a "pastel" mode of operation. In the pastel or transitory pastel region, the pastel signal assumes a value such that it cuts off the diode 95 and effectively disconnects the saturation output connection 91 from the non-linear mixer input 134. Thus, the pastel signal can be considered as an inhibitory signal with respect to the action of the saturation signal. In addition, at least in the transitory region, the pastel signal is used to modify the brightness signal in an appropriate manner to generate the black signal in a smooth manner.

In order to determine the percentiles of the end limits of the "pastel" region, the corrected picture should be evaluated, in terms of particular spectral characteristics of the colored printing inks and paper stock, for particular percentiles of corrected inks corresponding to pastel areas where, subjectively speaking, the human eye tends to lose some of its sense of detail and contrast. In these areas it becomes desirable to reintroduce black in order to restore the definition which has been lost due to the approach of colored ink percentiles to pastel region conditions.

The conditions determining the generation of black may be summarized as follows: (1) In regions of near-minimum saturation, the generation of black is primarily controlled by the brightness function. (2) In near-maximum saturation regions having low or intermediate brightness values, the generation of black is primarily controlled by the saturation signal. (3) In intermediate saturation regions having low or intermediate brightness values, the generation of black is controlled by both the saturation and the brightness signals. (4) In high brightness regions, without regard to the true colorimetric saturation condition, the generation of black is primarily controlled by the brightness function.

In the aforementioned copending patent application Serial No. 599,255, other circuits that may be used for the non-linear mixer 44 are described. Such circuits may be used in the non-linear mixer 44 of this invention to produce black plates of different types and to meet various preferences. In the pastel circuit 45 and the mixer 49, circuits for selecting extreme-valued signals other than the diode circuits described above may be used. Appropriate forms of such selector circuits are well known in the art.

In accordance with this invention, a new and improved system is provided for producing four-color corrected records corresponding to three primary colors and black. A black printer and a system for deriving black printers are provided that may be readily adapted to meet varied preferences and requirements in the amount of black to be printed.

What is claimed is:

1. Apparatus for deriving black printer information from a subject having color characteristics by means of signals representative of color components of said subject, said apparatus comprising means for producing first and second signals respectively representative of the brightness and of the color saturation of said subject from said color component signals, means for producing signals representative of the black of said subject from said brightness and color-saturation signals with the magnitude of said black signals being controlled in the main in accordance with the magnitude of those of said brightness signals representative of low brightness values, in accordance with the magnitudes of those of said color-saturation signals representative of near-maximum color-saturation values, except for pastel regions of high brightness, and for said pastel regions in accordance with the magnitudes of those of said brightness signals representative of high brightness values.

2. Apparatus for deriving black printer information from a subject having color characteristics by means of signals representative of color components of said subject, said apparatus comprising means for producing first and second signals respectively representative of the brightness and of the color saturation of said subject from said color component signals, and means for producing signals representative of the black of said subject by combining said brightness and color-saturation signals with the magnitudes of those of said black signals representative of high black values being primarily in accordance with the magnitudes of those of said brightness signals respresentative of low brightness values, with the magnitudes of those of said black signals representative of low black values being primarily in accordance with the magnitudes of those of said color-saturation signals representative of near-maximum color-saturation values except for pastel regions of high brightness, and with the magnitudes of those of said black signals representative of low black values in said pastel regions being primarily in accordance with the magnitudes of those of said brightness signals representative of high brightness values.

3. Apparatus for producing achromatic representative information from a subject in color by means of component-color representative signals derived from said subject, said apparatus comprising a circuit for producing a brightness representative signal from said component-color signals, a circuit for producing a color-saturation representative signal from said component-color signals, a circuit for producing a pastel representative signal from said component-color signals, and a circuit for producing an achromatic representative signal by combining said brightness signal and said color-saturation signal and said brightness signal and said pastel signal.

4. Apparatus for producing achromatic representative information from a subject in color by means of component-color representative signals derived from said subject, said apparatus comprising a circuit for producing a brightness representative signal from said component-color signals, a circuit for producing a color-saturation representative signal from said component-color signals, a circuit for producing a pastel signal from said component-color signals, a circuit for producing an achromatic representative signal from said brightness signal and said color-saturation signal, and means responsive to said pastel signal for applying said saturation signal to said achromatic representative circuit for certain values of said pastel signal and for not so applying said saturation signal for certain other values of said pastel signal.

5. In a system for obtaining color corrected records from a subject having color characteristics wherein apparatus produces a plurality of corrected color-component signals in accordance with a plurality of uncorrected color-component signals derived from said subject and in accordance with signals representative of the black of said subject, the combination with said apparatus of means for producing signals related to the brightness of said subject in accordance with a plurality of said uncorrected color-component signals, means for producing signals related to the color saturation of said subject in accordance with a plurality of said corrected color-component signals, means for producing signals related to the pastel state of said subject in accordance with said color-component signals, means responsive to said pastel signals for producing signals representative of the black of said subject in accordance with said brightness and color-saturation signals with the magnitude of said black signals being controlled primarily in accordance with the magnitude of those of said brightness signals representative of low brightness values, and primarily in accordance with the magnitude of those of said color-saturation signals representative of near-maximum color-saturation values for certain values of said pastel signals but not for certain other values thereof, and means for applying said black signals to said corrected signal producing apparatus.

6. Apparatus for producing achromatic representative information from a subject in color by means of component-color representative signals derived from said subject, said apparatus comprising a source of said component-color representative signals, a circuit for producing a brightness representative signal from said component-color representative signals, a circuit for producing a color-saturation representative signal from said component-color representative signals, a circuit for producing a pastel representative signal from said component-color signals, and a circuit for producing an achromatic representative signal from said brightness representative signal in response to a pastel signal representative of a pastel-color region and from a combination of said brightness representative signal and said color-saturation representative signal in response to a pastel signal representative of a non-pastel color region.

7. In a system for obtaining color corrected records from a subject having color characteristics, in which system apparatus produces a plurality of corrected color-component signals in accordance with a plurality of uncorrected color-component signals derived from said subject and in accordance with signals representative of the black of said subject, the combination with said apparatus of means for producing signals related to the brightness of said subject in accordance with a plurality of said color-component signals, means for producing signals related to the color saturation of said subject in accordance with a plurality of said color-component signals, means for producing signals related to the pastel color condition of said subject in accordance with a plurality of said color-component signals, means for producing signals representative of the black of said subject in accordance with said brightness, color saturation, and pastel signals, and means for applying said black signals to said corrected signal producing apparatus.

8. In a system for obtaining color corrected records from a subject having color characteristics wherein apparatus produces a plurality of corrected color-component signals in accordance with a plurality of uncorrected color-component signals derived from said subject and in accordance with signals representative of the black of said subject, the combination with said apparatus of means for producing first signals in accordance with a plurality of said color-component signals, means for producing second signals in accordance with a plurality of said color-component signals, means for producing third signals in accordance with a plurality of said color-component signals, said first, second, and third signals being representative of different color conditions, means for producing signals representative of the black of said subject in accordance with said first, second, and third signals, and means for applying said black signals to said corrected signal producing apparatus.

9. Apparatus for producing achromatic representative information from a subject having color characteristics by means of component-color representative signals derived from said subject, said apparatus comprising a circuit for producing a brightness representative signal from said component-color signals, a circuit for producing a color-saturation representative signal from said component-color signals, a circuit for producing a pastel representative signal from said component-color signals, and a circuit for producing an achromatic representative signal from said brightness signal and said color-saturation signal with said achromatic signal being primarily controlled by said brightness signal under the condition of said color-saturation signal being representative of a low level of color saturation, with said achromatic signal being produced at an extreme value under the condition of said color-saturation signal being representative of a high level of color saturation except under the condition of said pastel signal being representative of a certain low level color state, and with said achromatic signal being primarily controlled by said brightness signal under the condition of said pastel signal being representative of said certain low-level color state.

10. In a system for obtaining color corrected records from a subject having color characteristics wherein apparatus produces a set of corrected signals corresponding to different color components in accordance with a set of uncorrected signals corresponding to different color components, said uncorrected signals being derived in accordance with the color characteristics of said subject, the combination with said apparatus of means for producing a first signal in accordance with a certain combination of all of one of said sets of signals, means for producing a second signal in accordance with the condition of one or more of said component-color signals of one of said sets being beyond a certain value, means for producing a third signal in accordance with the condition of the one of said component-color signals of one of said sets that is extreme-valued in one direction is beyond in the other direction a certain signal value, and means responsive to said first, second, and third signals for producing a signal representative of the black of said subject.

11. In a system for obtaining color corrected records from a subject having color characteristics, in which system said apparatus produces a plurality of corrected color-component signals in accordance with a plurality of uncorrected color-component signals derived from said subject and in accordance with signals representative of the black of said subject, the combination with said apparatus of means for producing first signals in accordance with a certain combination of said uncorrected signals, means for producing second signals in accordance with a combination of those portions of said corrected signals that are beyond certain values, means for producing third signals in accordance with the extreme-valued one of said corrected signals, means for producing fourth signals in accordance with the extreme-valued one of said second and third signals, means for producing signals representative of the black of said subject in accordance with said first and fourth signals, and means for applying said black signals to said corrected signal producing apparatus.

References Cited in the file of this patent

UNITED STATES PATENTS

| | | |
|---|---|---|
| 2,231,668 | Hall | Feb. 11, 1941 |
| 2,434,561 | Hardy | Jan. 13, 1948 |
| 2,592,291 | Kellogg | Apr. 8, 1952 |
| 2,691,696 | Yule | Oct. 12, 1954 |
| 2,721,892 | Yule | Oct. 25, 1955 |
| 2,727,940 | Moe | Dec. 20, 1955 |
| 2,740,832 | Andrews | Apr. 3, 1956 |
| 2,748,190 | Yule | May 29, 1956 |
| 2,807,660 | Rose | Sept. 24, 1957 |